E. KEEN.
COMBINED MIRROR AND REFLECTOR.
APPLICATION FILED OCT. 2, 1915.
1,192,905.
Patented Aug. 1, 1916.
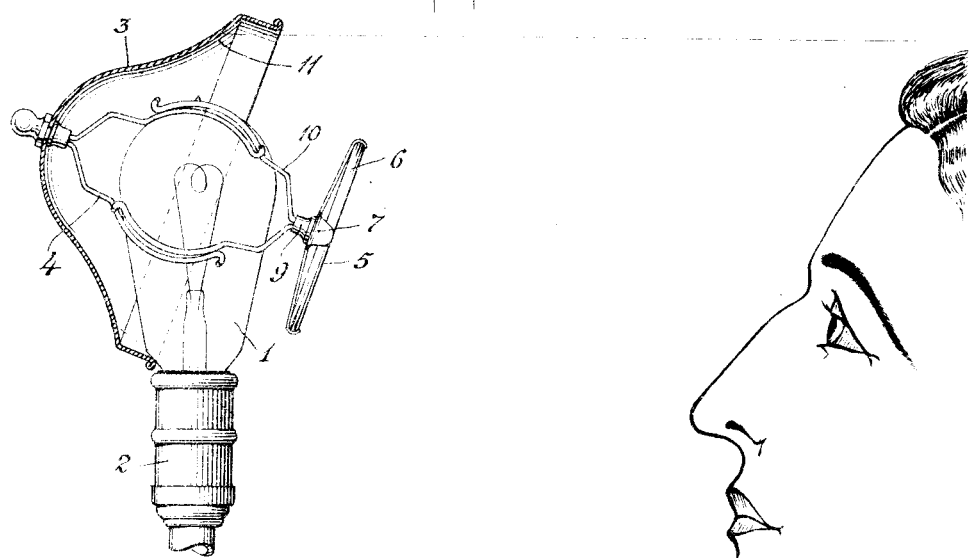
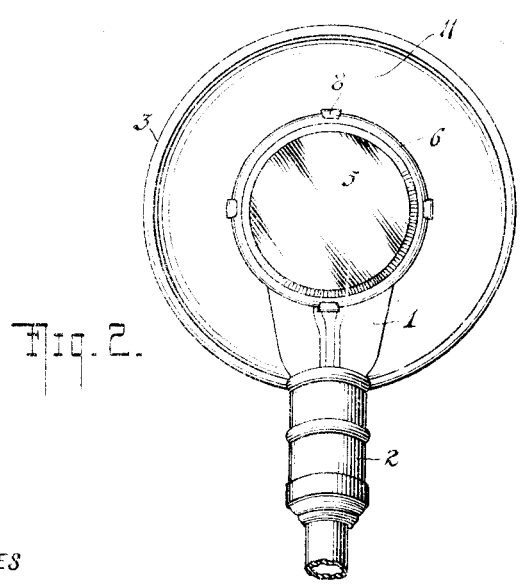
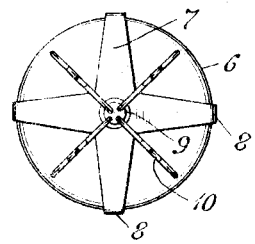
WITNESSES
INVENTOR
ELIOT KEEN
BY
ATTORNEYS

UNITED STATES PATENT OFFICE.

ELIOT KEEN, OF BROOKLYN, NEW YORK, ASSIGNOR TO THE ALADDIN LAMP CORPORATION, OF NEW YORK, N. Y., A CORPORATION OF DELAWARE.

COMBINED MIRROR AND REFLECTOR.

1,192,905.  Specification of Letters Patent.  Patented Aug. 1, 1916.

Application filed October 2, 1915. Serial No. 53,698.

*To all whom it may concern:*

Be it known that I, ELIOT KEEN, a citizen of the United States, residing in the borough of Brooklyn, county of Kings, city and State of New York, have invented certain new and useful Improvements in a Combined Mirror and Reflector, of which the following is a specification.

My invention relates to a combination of mirror and reflector.

More particularly my invention relates to the combination as aforesaid arranged for use in connection with an incandescent electric light, the reflector and the mirror being separately attachable to or detachable from such a lamp. In this way the lamp and reflector can be used alone for the purpose of projecting or distributing light or, if desired, the mirror may be added so that the arrangement may be used for such purposes as shaving and the like, and in the conventional way where special illumination is necessary.

My invention will be better understood by referring to the drawing in which—

Figure 1 shows an elevation, part section, of my invention as applied to an ordinary incandescent electric lamp; Fig. 2 is a view of the arrangement shown in Fig. 1 taken from the right; and Fig. 3 is a rear view of the mirror.

Referring to the drawing, 1, represents a usual incandescent lamp bulb held in a socket, 2, and 3 represents a concave reflector provided with a centrally disposed group of spring arms, 4, on the inner side thereof, the said arms being spaced 90° apart and shaped so as to substantially conform to the exterior surface of the lamp bulb. These arms are made of light but elastic spring wire thus permitting the reflector to be readily attached to or disattached from the bulb by merely forcing the arms over the bulb or withdrawing them therefrom. The mirror, 5, preferably plane, and held in a flanged mounting, 6, has a skeleton frame, 7, of spring metal or the like at its back, the frame having arms with ends, 8, which are bent over the mounting so as to hold the same. Projecting rearwardly from and attached to a boss, 9, at the center of the frame is a group of four spring arms, 10, similar to the arms, 4, belonging to the reflector. The spring arms, 10, permit the mirror to be attached to the lamp bulb in the same manner as described for the reflector above with the axis of the mirror coincident with the axis of the reflector. As thus arranged, the combined lamp, mirror and reflector, when the lamp is lighted, provides, as viewed from the front of the mirror (Fig. 1) an annular field of light, 11, which projects forwardly divergent rays so as to illuminate objects in front of the mirror, the mirror acting as a shield to prevent the direct rays of the lamp reaching the object. The light from the annular surface of the reflector is necessarily soft and moderate so that the arrangement constitutes a very convenient one for shaving and toilet purposes.

With the mirror withdrawn from the lamp, rays are projected forwardly both from the lamp itself and from the reflector.

Having described my invention, I claim:

In combination, a lamp bulb, a circular concave reflector at the back of the bulb and a smaller circular mirror in front of the bulb said mirror having spring arms frictionally engaged with said bulb so that the mirror may have its axis brought into coincidence with that of the reflector and may also be attached to or detached from the bulb at will.

In testimony whereof I have hereunto set my hand.

ELIOT KEEN.